B. S. Stedman,
Cutting Veneers.
N° 6,567.   Patented July 3, 1849.
Fig. 1.
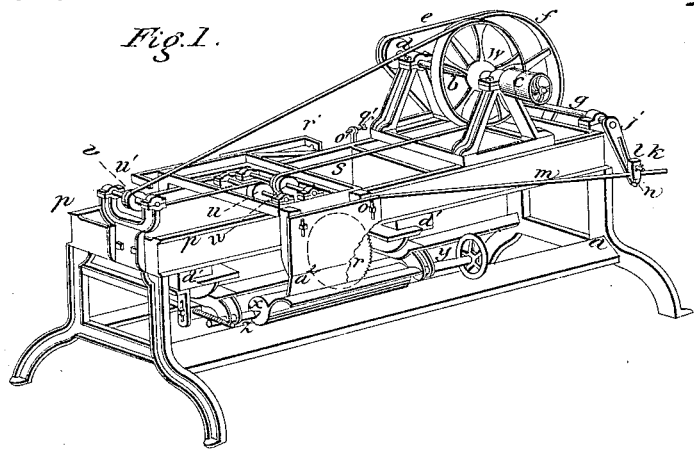
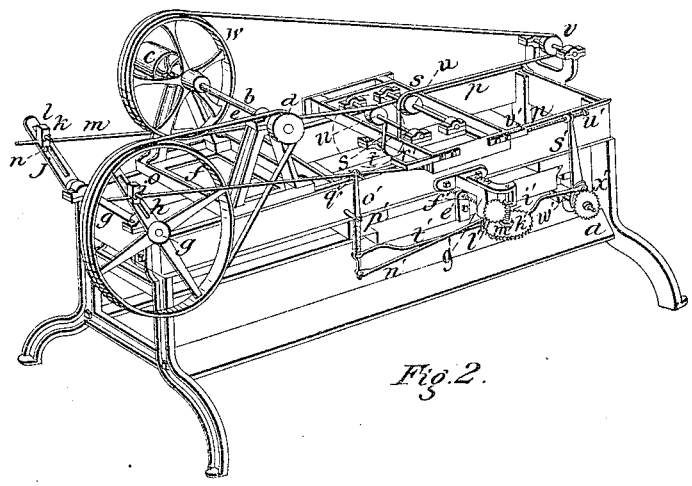
Fig. 2.
Fig. 3.
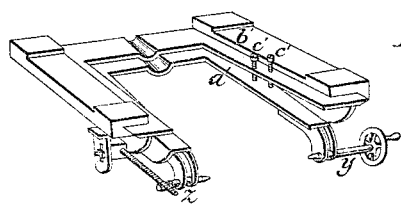

UNITED STATES PATENT OFFICE.

BENJAN. S. STEDMAN, OF WARREN, MASSACHUSETTS.

MACHINE FOR CUTTING VENEERS FROM CYLINDRICAL BLOCKS.

Specification of Letters Patent No. 6,567, dated July 3, 1849.

*To all whom it may concern:*

Be it known that I, BENJAMIN S. STEDMAN, of Warren, in the county of Worcester and State of Massachusetts, have invented certain new and useful improvements in the machine for sawing veneers from cylindrical blocks of ivory, wood, and other like substances, and that the following is a full, clear, and exact description of the principle or character which distinguishes them from all other things before known and of the manner of making, constructing, and using the same, reference being had to the accompanying drawings, making part of this specification, in which—

Figure 1 is a perspective view of the machine taken from the side of the machine on which the saw is placed; Fig. 2, a like representation from the opposite side of the machine; Fig. 3, a perspective view of the carriage which carries the block to be sawed; and Figs. 4 and 5 represent respectively horizontal and vertical sections of the machine taken through the axis of the shaft ($h'$).

My invention relates to improvements on the machine for sawing by means of a circular saw veneers from the periphery of a cylindrical block in the form of a volute, and principally intended for the sawing of ivory, in which great accuracy is required in the movements of the various parts. In my improved machine the arbor of the circular saw is hung in a carriage which receives a reciprocating motion in the direction of the plane of the saw by a crank motion the driving belt for carrying the saw passing from a driving drum hung in the permanent part of the frame, thence around a guide pulley, from this around the pulley on the saw arbor below, then around another guide pulley corresponding with the first guide pulley, and from this around a pulley at the opposite end of the frame and beyond the carriage, and thence back to the driving drum, so that the saw can be driven from a drum on the fixed part of the frame and yet have a reciprocating motion to move back and forth from end to end of the block to be sawed. And below the saw carriage is another carriage which carries the block to be sawed and which moves at right angles to the saw carriage that the axis of the block may be moved gradually toward the line of cut of the saw, and by an intermittent motion, the mandrel which carries the block at the same time receiving an intermittent rotary motion to feed the block to the saw. All the motions, except the rotation of the saw, are positive motions, but adjustable to adapt the machine to various lengths and diameter of blocks and to the thickness of veneers.

In the accompanying drawings, ($a$) represents a frame adapted to the purpose, but which may be varied at pleasure. On this is mounted the main driving shaft ($b$) with a fast and a loose pulley ($c$) on one end of it to receive a driving band from some first mover for driving the whole machine. On the other end there is a pulley ($d$) which communicates motion by a band ($e$) to a large band wheel ($f$) on a shaft ($g$) at one end of the frame. One of the arms ($h$) of the wheel ($f$) is slotted to receive a crank wrist ($i$) which can thus be adjusted to any required length of throw, and on the other end of the shaft of this wheel there is a crank arm ($j$) which is also slotted in the same manner and for the same purpose to receive another crank wrist ($k$). To these crank wrists are fitted blocks ($l, l$) through which pass connecting rods ($m, m$) fitted to slide in holes therein and secured by temper screws ($n, n$) that the length of the connecting rods may be adjusted at pleasure. The opposite ends of these rods are jointed to the saw carriage ($o$) which embraces ways ($p, p$) on the top of the frame and to slide thereon accurately. The arbor ($q$) of the circular saw ($r$) has its bearings in this carriage so that as the carriage is reciprocated by the return of the shaft ($g$) the saw is carried from end to end of the block to be sawed, and by the adjustment of the throw of the crank pins this motion can be adjusted to any required length of block. The saw is driven during the reciprocating motions of the carriage by a band ($s$) which passes around a pulley ($t$) on its arbor, and thence up on each side over two guide pulleys ($u, u$) the arbors of which have their bearings in the upper part of the carriage and above the saw arbor, and from these two pulleys the band passes in one direction to a pulley ($v$) at the end of the frame and in the other over a band wheel ($w$) on the main driving shaft. By this arrangement the carriage with the saw can move from end to end of the block to be sawed yet receive its rotating motion from the driving shaft.

The block ($x$) to be sawed is hung at one end to a mandrel ($y$) and turns on an adjusting center ($z$) at the other, and this mandrel and center are attached to the forward part of a swinging frame ($a'$) the rear part of which is jointed to a carriage ($b'$) so that by means of regulating screws ($c'$, $c'$) that connect the two the position of the log relatively to the periphery of the blocks can be adjusted vertically, for the saw should act on the block at a radius forming a right angle with the plane of the saw, in other words the plane of the saw should always be a tangent to the diameter cut, and as the diameter of the saw is reduced by wear the position of the block must be varied. The carriage ($b'$) to which the swinging frame is jointed slides in ways ($d'$, $d'$) of the frame and at right angles with the line of motion of the saw carriage, and this motion is for the purpose of carrying the block toward the saw as the veneer is cut off, and its motion must therefore be intermittent, for after the saw has made one cut from end to end, the block must be moved toward the saw for the next cut. This motion is given in the following manner. To the rear of the carriage is attached a nut ($e'$) in which is tapped a screw ($f'$) which has journals that turn in a standard ($g'$) permanently secured to the frame. On the end of the screw there is a cog wheel ($h'$) the cogs of which are accurately fitted to receive the threads of a worm ($i'$) on a vertical arbor ($j'$) and on this arbor there is a ratchet wheel ($k'$) which is turned at the required time by a hand ($l'$) on the end of an arm ($m'$) that vibrates on the arbor of the ratchet wheel, so that at every forward vibration of the arm the ratchet wheel is turned a given distance which by the connections described moves the carriage and the block toward the saw. The arm ($m'$) is operated by a connecting rod ($n'$) jointed to it and which is in turn jointed to a lever ($o'$) that turns on a fulcrum ($p'$) its upper end having a screw ($q'$) the end of which is struck by a projection ($r'$) of the saw carriage toward the end of its motion in the direction of the arrow; but as the block must be moved up toward the saw at the end of each motion of the saw carriage there is another lever ($s'$) at the other end which is connected with the one described by a connecting rod ($t'$), so that the required motion is given at either end. The last named lever ($s'$) is also provided with a screw ($u'$) which is in like manner struck at the required time by a projection ($v'$) of the saw carriage. The screws on these levers are for the purpose of regulating the amount of motion to be given to the block in proportion to the thickness of veneer to be cut. The projecting pieces ($r'$) and ($v'$) are connected with the saw carriage by means of screws passing through slots that their position may be varied to suit the length of motion of the carriage. When the block is moved toward the saw to give the required thickness of veneer it must at the same time be turned on its axis to give the required feed for the cut of the saw, which is done in the following manner. The lever ($s'$) turns on an arbor ($w'$) as a fulcrum, and is provided with a hand that engages the teeth of a ratchet wheel ($x'$) on the end of the said arbor, and on the other end of this said arbor there is a worm the threads of which engage the cogs of a wheel ($y'$) on the end of the mandrel which carries the block. In this way the motion which advances the block at the same time turns it from the feed. But as it is necessary at times to vary the rotating feed motion relatively to the advancing motion, the connecting rod ($t'$) which forms the connection between the two levers can be shifted along the lever ($o'$) to vary the leverage of this connection, and the other connecting rod ($n'$) which forms the connection for the advancing motion can also be shifted along the arm of the lever ($o'$).

The two ratchet wheels ($k'$) and ($x'$) are each provided with a retaining hand or pawl ($z'$ $z''$).

By the foregoing combinations and arrangements of parts it will be seen that the advancing motion of the block toward the saw, and its rotating feed motion are all positive as well as the reciprocating motion of the saw carriage all of which are derived from the latter. And it will also be seen that by the shifting crank pins any desired range of motion can be given to the saw carriage and that the connections by which this operates the other parts can also be varied while at the same time the advancing and rotating motions of the block can be varied and adjusted with the utmost nicety.

In front of the saw there is a guard or guide plate ($a^2$) for directing the veneer as it is separated from the periphery of the block.

It will be obvious to any competent mechanician that the structure of the various parts, and the arrangement of them may be varied to attain the same end, without materially changing the principle or character of the combinations which constitute the principle or mode of operation of my invention, and therefore I do not wish to confine myself to the precise structure or arrangement herein described, so long as the same ends are attained by substantially the same means, or any of them.

What I claim as my invention and desire to secure by Letters Patent, is—

1. The reciprocating saw carriage in which the saw is operated by a belt from a driving pulley on the main frame and passing around a guide pulley on the permanent frame and the guide pulleys on the carriage, substantially as herein described, in combination with the carriage which carries the block to be sawed and which has an intermittent motion toward the saw derived from the reciprocating motion of the saw carriage, substantially as herein described.

2. I also claim the combination of the apparatus for giving the advancing motion of the block toward the saw, with the apparatus which gives the rotating feed motion to the block, substantially as herein described, but this I only claim when the two are connected together and derive their motions one from the other, and when the connection between the two is adjustable to vary their relative motions, substantially as described.

3. I also claim the combined apparatus for advancing and rotating the block in combination with the reciprocating saw carriage by the means substantially as herein described, when the method of operating the carriage is adjustable to various lengths of blocks and when the said connections between the carriage and the advancing and rotating apparatus are adjustable, substantially as described.

BENJAN S. STEDMAN.

Witnesses:
A. P. BROWN,
A. E. PETERS.